United States Patent
Lo et al.

(10) Patent No.: US 6,366,973 B1
(45) Date of Patent: Apr. 2, 2002

(54) SLAVE INTERFACE CIRCUIT FOR PROVIDING COMMUNICATION BETWEEN A PERIPHERAL COMPONENT INTERCONNECT (PCI) DOMAIN AND AN ADVANCED SYSTEM BUS (ASB)

(75) Inventors: Burton B. Lo, San Francisco; Anthony L. Pan, Fremont, both of CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/304,034

(22) Filed: May 3, 1999

(51) Int. Cl.[7] .............................................. G06F 13/40
(52) U.S. Cl. ....................... 710/128; 710/129
(58) Field of Search ................................ 710/126–132

(56) References Cited

U.S. PATENT DOCUMENTS 5,659,690 A * 8/1997 Stuber et al. ................ 710/129
6,247,082 B1 * 6/2001 Lo et al. ...................... 710/105

* cited by examiner

*Primary Examiner*—Sumati Lefkowitz
(74) *Attorney, Agent, or Firm*—Wagner, Murabito & Hao LLP (57) ABSTRACT

A slave interface circuit for providing communication between a PCI (Peripheral Component Interconnect) bus domain and an ASB (Advanced System Bus) bus domain. The novel circuit is an integrated interface for communicating using the AMBA (Advanced Microcontroller Bus Architecture) ASB protocol and translating ASB commands into PCI like commands. Embodiments include interfaces that are particularly suited for FPGA (field programmable gate array) and ASIC (application specific integrated circuit) implementations. A high-speed embodiment is also discussed allowing prefetch functionality. Input latches catch ASB commands on the falling edge of the ASB clock and then circuits reformat the data using size information and address bits from the ASB bus. This allows byte, halfword and word accesses. Byte readback data are provided on all four byte lanes and halfword readback data are provided on both halfword lanes. The reformatted data is latched into a set of request registers on the next rising edge of the ASB clock. During an ASB read request, the read data is latched on the rising edge of the ASB clock such that the ASB master agent can latch its requested data on the next falling edge of the ASB clock. The other handshake signals are latched on the falling edge of the ASB clock. An ASB master agent can sense the handshake on the rising edge of the ASB clock. Pipeline architecture allows the bus protocols to operate at optimum speed and supports the natural flow of data between the ASB and PCI domains without the need for wait cycles. Pipelined ASB burst cycles are supported.

23 Claims, 10 Drawing Sheets

SLAVE INTERFACE CIRCUIT FOR PROVIDING COMMUNICATION BETWEEN A PERIPHERAL COMPONENT INTERCONNECT (PCI) DOMAIN AND AN ADVANCED SYSTEM BUS (ASB)

BACKGROUND OF THE INVENTION

1. Field of the Invention

The present invention relates to the field of digital electronic systems. More particularly, the present invention relates to the field of interface circuits used for the communication of information between two or more electronic domains or subsystems wherein one or more circuit portions functions as a slave interface.

2. Related Art

Designs of computer systems and computer system architectures today can include the combination of one or more different subsystems with each subsystem having a different bus architecture or protocol. Subsystems are combined to facilitate the implementation of larger systems and typically known and standard subsystems are the ones selected for combining. By using known and standard subsystems, design time, manufacturing costs, design complexity, system maintenance and trouble shooting can all be reduced advantageously.

One standard bus architecture is the Peripheral Component Interconnect (PCI) bus standard. Computer systems can communicate with coupled peripherals using different bus standards including the PCI bus standard, or alternatively, using the Industry Standard Architecture (ISA) and Extended Industry Standard Architecture (EISA) bus standards. Recently, the IEEE 1394 serial communication standard has become a popular bus standard adopted by manufacturers of computer systems and peripheral components for its high speed and interconnection flexibility. Another interface bus (developed for the ARM processor) is the Advanced Microcontroller Bus Architecture (AMBA) which defines the Advanced System Bus (ASB). The Advanced RISC Machine (ARM) processor is a special purpose, user-customizable RISC processor. Each of the above communication standards communicates information (e.g., in data packets) using different bus protocols particular to the bus architecture.

Interconnected subsystems of an integrated circuit design do not necessarily communicate or operate using the same bus protocols. Due to the many bus architecture standards available within computer systems and communication systems, it is often the case that one computer (or device) of one bus standard or "bus protocol domain" is coupled to and communicates with another computer (or device) of another bus standard having another different bus protocol. Since the bus standards are not necessarily compatible, bridge circuits or "interface circuits" have been used in the prior art to generate special handshaking signals, or otherwise function, to allow communication from one bus domain to another. The interface circuit is physically coupled between the two bus domains and is thereby made available to receive and send data or control information between the bus domains.

Figure 1:
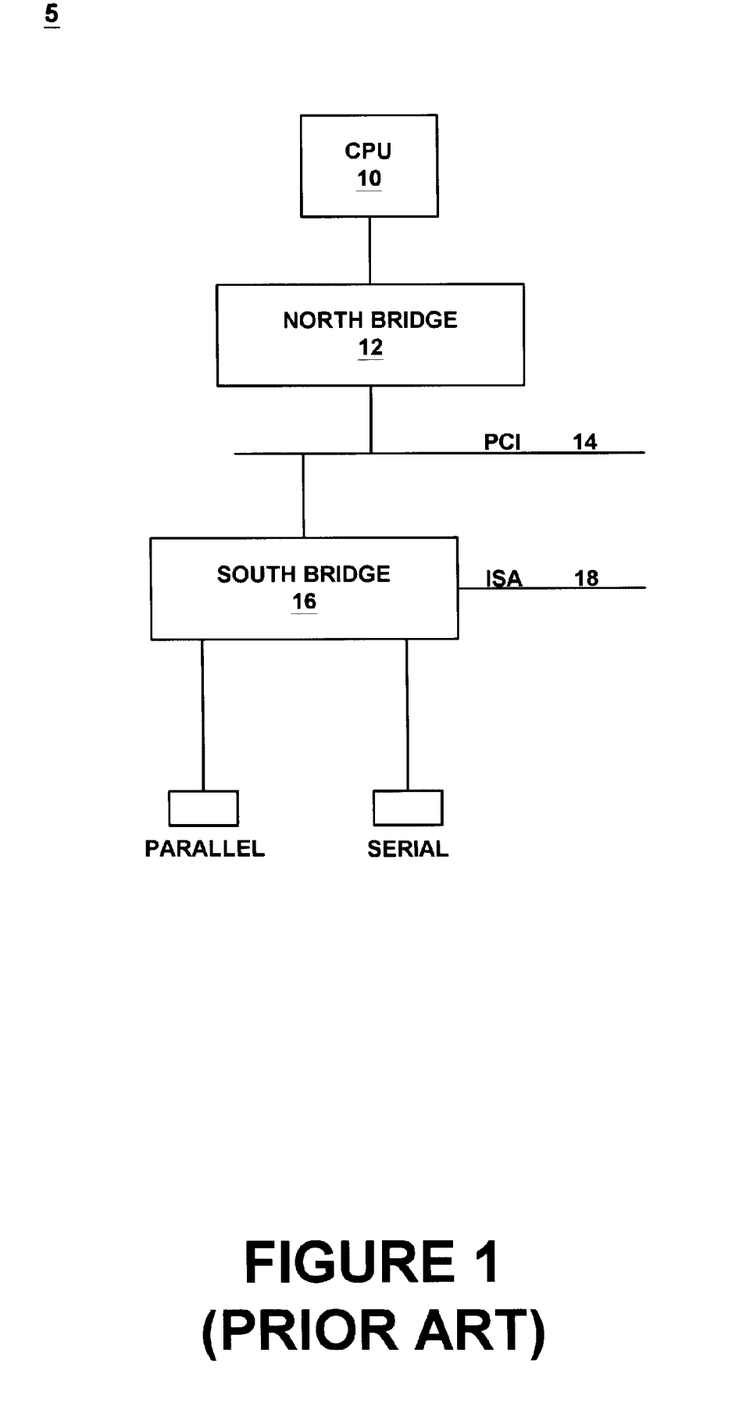
FIG. 1 depicts the prior art configuration of a host computer having a general purpose Central Processing Unit (CPU) interfaced to a Peripheral Component Interconnect (PCI) device via a Northbridge integrated circuit device.

The prior art configuration 5 of FIG. 1 shows a host computer's general Central Processing Unit (CPU) 10 interfaced to a Peripheral Component Interconnect (PCI) bus (or device) 14 via a Northbridge integrated circuit device 12. The Northbridge device 12 is commercially available for that use. Similarly, the Southbridge device 16 is also readily available for purposes of interfacing a general purpose CPU 10 to an ISA device 18.

Unlike commercially available CPUs, the Advanced RISC Machine (ARM) processor is a special purpose, user-customizable RISC processor which is very well suited to processor-intensive functions, such as handwriting recognition and other real-time digital signal processing applications for data and voice communications. With ARM's small 32 bit RISC CPUs, integrated, high performance designs can be custom developed for relatively very fast time-to-market and low product development costs.

PCI-based computer peripheral devices are used extensively in host computer systems and are readily available commercially. One reason why the ARM processor has not been combined with a PCI device is due to the fact that host computers use general purpose CPUs, which can be interfaced to PCI devices using the Northbridge solution.

Embedding an ARM processor for a specialized subsystem function, such as within a network adapter interface card, can significantly improve the overall host system performance since it lessens the need to use the host CPU for the subsystem networking functions. So, to the extent that an embedded processor can perform the network subsystem processor functions, it frees up the host CPU for other higher priority processing tasks. However, use of an ARM processor embedded within the network adapter subsystem can only be advantageous if the ARM processor can be interfaced to communicate with a PCI-based host CPU and other PCI peripheral devices through the PCI bus.

One interface bus developed for the ARM processor is the Advanced Microcontroller Bus Architecture (AMBA) which defines the Advanced System Bus (ASB). However, the bus protocols are different between the PCI and ASB domains, for instance, the AMBA ASB bus and the PCI bus operate at different clock frequencies and have different signaling schemes for data communication. Unlike the Northbridge device which exists to interface between general purpose CPUs and the PCI bus, there are no known devices for bridging between the ARM processor and a PCI interface bus.

Accordingly, the present invention provides an interface circuit for providing communication between subsystem domains having different bus protocols within an electronic system. The present invention provides a pipelined interface circuit that provides the above communication without performance degradation by allowing each bus domain to operate at its optimum frequency and standard. These and other advantages of the present invention not specifically mentioned above will become clear within discussions of the present invention presented herein.

SUMMARY OF THE INVENTION

A slave interface circuit is described herein for providing communication between a PCI bus domain and an AMBA ASB bus domain. The novel circuit is an integrated interface for communicating using ASB protocol and translating ASB commands into PCI like commands. Embodiments include interfaces that are particularly suited for FPGA (field programmable gate array) and ASIC (application specific integrated circuit) implementations. A high-speed embodiment is also discussed offering prefetch functionality. The slave interface circuit of the present invention uses pipelined circuit stages to effectively manage the problem where the AMBA bus specifications require an ASB command to be issued on the falling edge of the ASB clock (B_CLK) and the associated data is to be provided on the following falling edge of the B_CLK. Generally, pipeline architecture of the slave interface circuit allows the bus protocols to operate at optimum speed and supports the natural flow of data between the AMBA ASB and PCI domains without the need for wait cycles. Pipelined ASB burst cycles are supported.

Input latches catch ASB commands on the falling edge of the ASB clock (B_CLK) and then circuits are used to reformat the data using size information (B_SIZE) and address bits (B_ADDR) from the ASB bus and swap bytes and generate the required byte enable (BEN) signals. The invention allows byte, halfword (2-byte) and fullword (4-byte) accesses. Byte readback data are provided on all four byte lanes and halfword readback data are provided on both halfword lanes. The reformatted data is latched into a set of request registers on the next rising edge of the ASB clock. A clock boundary crossing circuit can be used to handshake the data to a second independent clock domain. The ASB slave interface circuit runs on the ASB clock while the service agents may be running on a totally independent second clock.

During an ASB read request, the read data is latched on the rising edge of the ASB clock such that an ASB master agent can latch its requested data on the next falling edge of the ASB clock. The other handshake signals (B_WAIT, B_LAST and B_ERR) are latched on the falling edge of the ASB clock and the output enable is asserted during the low duration of the edge of the ASB clock. The ASB master agent can sense the handshake on the rising edge of the ASB clock.

Specifically, embodiments of the present invention include a pipelined interface circuit comprising: an input latch circuit for receiving and holding address and size signals from a first bus domain; a hold circuit for receiving and holding outputs from the input latch circuit and for receiving and holding data signals from the first bus domain wherein the data signals arrive one clock cycle behind the address and size signals; a first data translate and replicate circuit coupled to the hold circuit and for reformatting the data signals into first formatted data signals which are formatted for a second bus domain; and a request circuit for receiving outputs from the first data translate and replicate circuit and for receiving outputs from the hold circuit, the request circuit for generating a request to the second bus domain and for simultaneously providing the second bus domain with the address signals, the first reformatted data signals and byte enable signals and wherein the input latch circuit, the hold circuit and the request circuit are all clocked by a clock signal of the first bus domain. The above embodiment is particularly suited for FPGA applications. Embodiments include the above and wherein the first bus domain is compliant with the ASB bus standard and wherein the second bus domain is compliant with the PCI bus standard. Embodiments also include an implementation specific for ASIC designs and also a high performance implementation using prefetch circuitry.

DETAILED DESCRIPTION OF THE INVENTION

In the following detailed description of the present invention, a slave interface circuit for providing communication between a PCI bus domain and an AMBA ASB bus domain of an electronic system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 2:
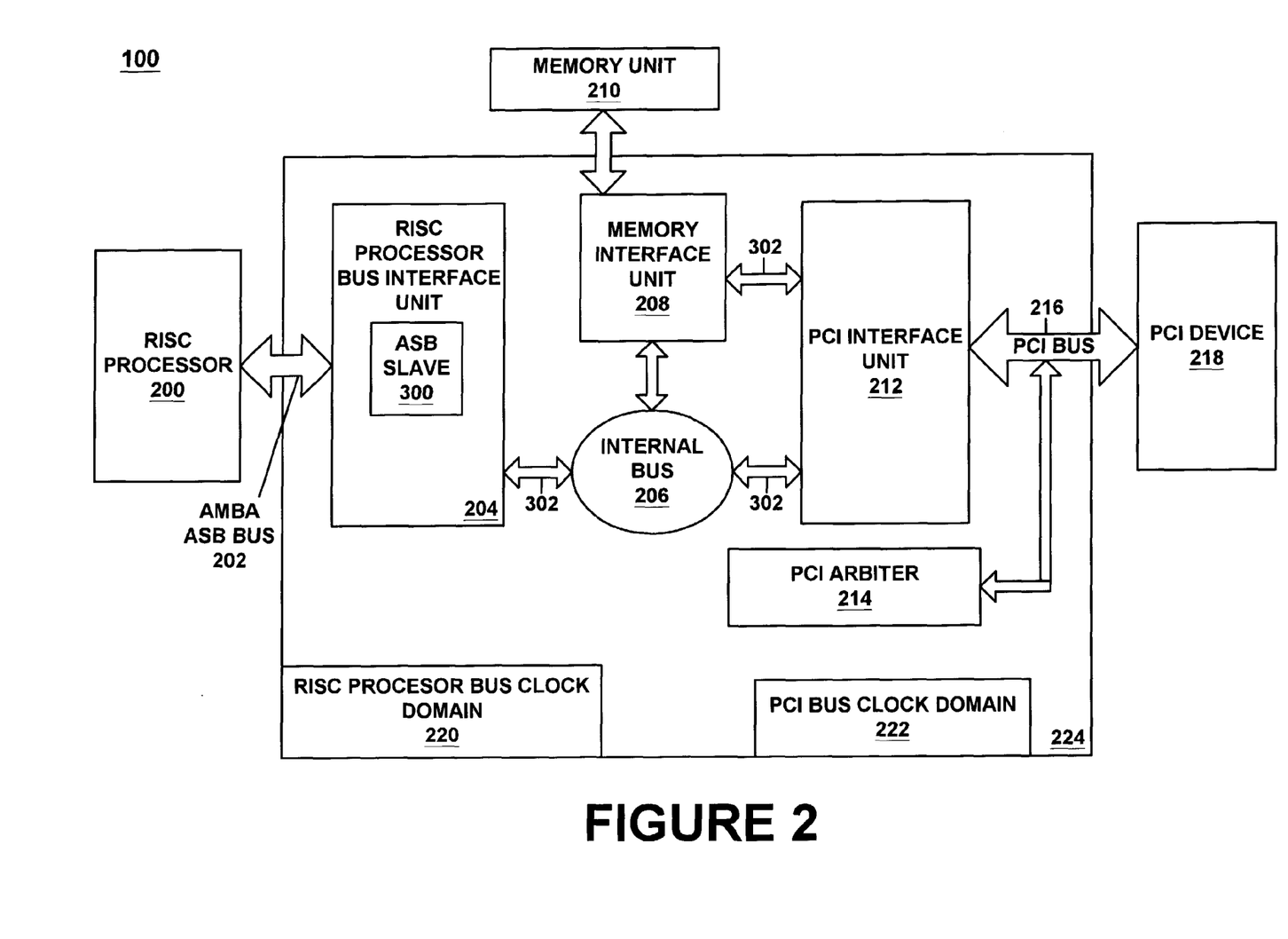
FIG. 2 is a high level block diagram of a bridge circuit in accordance with an embodiment of the present invention for bridging from the RISC processor bus to the PCI bus.

With reference to FIG. 2 an electronic system 100 is shown. System 100 is an exemplary system in which embodiments of the interface circuit of the present invention can operate. Within system 100, a RISC processor 200 communicates with a RISC processor bus interface unit 204 via the AMBA ASB bus 202 (herein after called ASB bus or AMBA bus). The RISC processor bus interface unit 204 is coupled to a memory interface unit 208 via an internal bus 206. The memory interface unit 208 accesses a memory unit 210. A PCI interface unit 212 is coupled to a PCI device 218 via a PCI bus 216. The PCI interface unit 212 is also directly coupled to the memory interface unit 208. A PCI arbiter 214, which may be any commercially available implementation of a PCI arbiter, is coupled to the PCI bus 216, and arbitrates memory access to the latter. The PCI interface unit 212 also communicates directly with the internal bus 206. In one embodiment, the RISC processor bus clock 220 operates at a frequency ranging from 4 to 20 MHz, while the PCI bus clock 222 operates at a frequency of 33 MHz.

In one embodiment, the RISC processor bus interface unit 204, the memory interface unit 208, the internal bus 206, the PCI interface unit 212, and the PCI arbiter 214 are implemented in a single-chip integrated ASIC 224.

The RISC processor bus interface circuit 204 of FIG. 2 includes an ASB slave interface circuit 300 in accordance with the present invention for translating ASB commands into PCI like commands and providing communication between the ASB bus 202 and the PCI bus 216. RISC processor bus interface circuit 204 can also include a clock domain interface circuit which is described in co-pending U.S. patent application Ser. No. 09/186,209, filed Nov. 3, 1998, entitled "Method and Circuit for Providing Handshaking to Transact Information Across Multiple Clock Domains," by B. Lo and A. Pan, assigneed to the asignee of the present invention, which is hereby incorporated herein by reference. The ASB slave interface circuit 300 is described below with respect to three embodiments, 300a, 300b and 300c.

ASB SLAVE INTERFACE CIRCUIT OF THE PRESENT INVENTION

Figure 3:
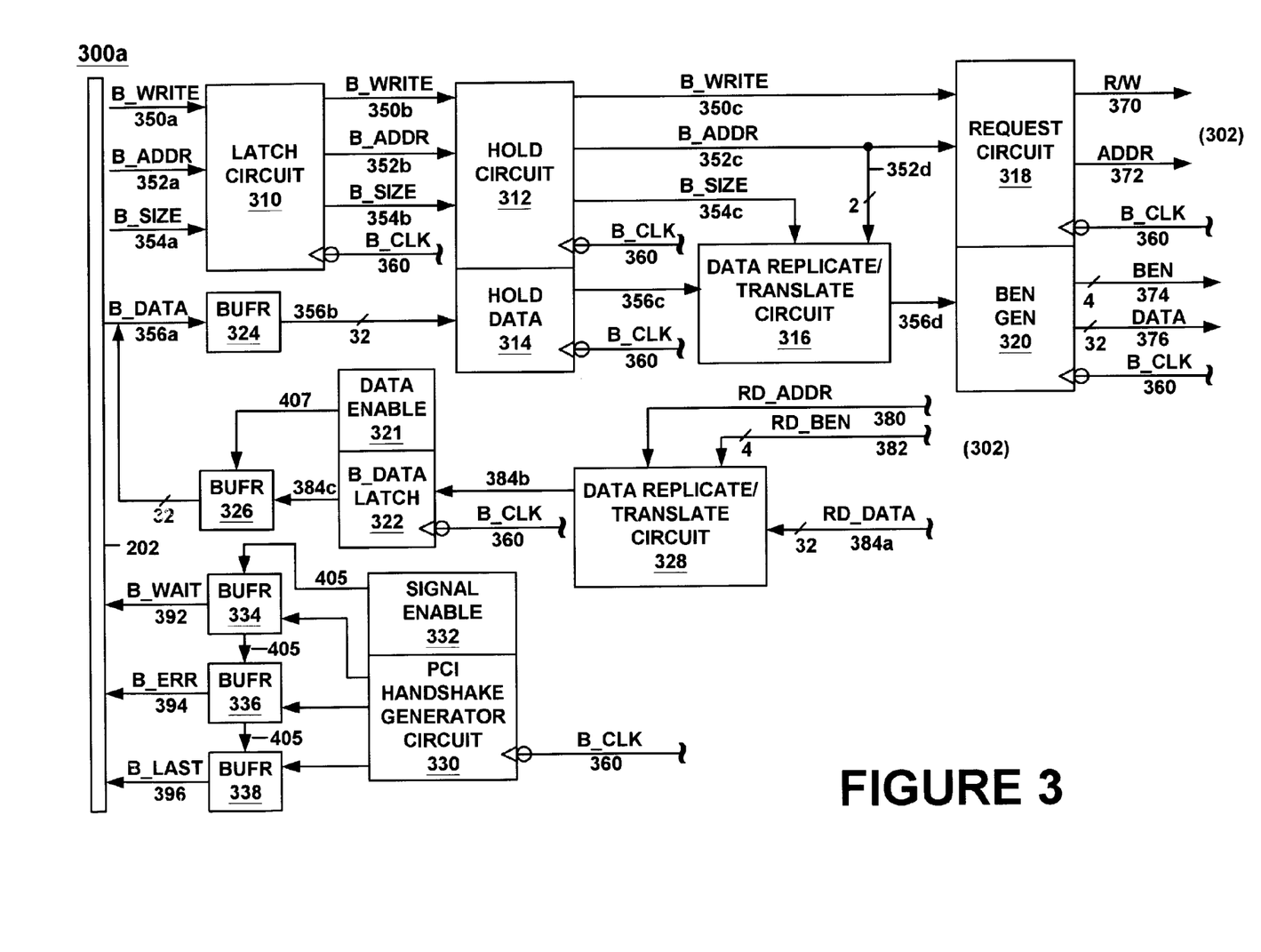
FIG. 3 is a circuit diagram of one implementation of the ASB slave interface circuit of the present invention.

FIG. 3 illustrates an embodiment 300a of an ASB slave interface circuit in accordance with the present invention.

Circuit embodiment 300a can be implemented in any technology but is particularly advantageous for use within a field programmable gate array (FPGA) architecture due to its use of input latch circuitry. The ASB slave interface embodiment 300a can be used within system 100 of FIG. 2 to implement ASB to PCI bus communication, e.g., to allow ASB commands to be used to access memory unit 210. Use within system 100 is exemplary only and when used in this configuration, the circuit 300a is coupled to provide communication between ASB bus 202 and internal bus 302. Generally, the ASB slave interface circuit 300a can be used within any integrated circuit system that requires ASB commands to be translated into PCI like data.

Figure 6:
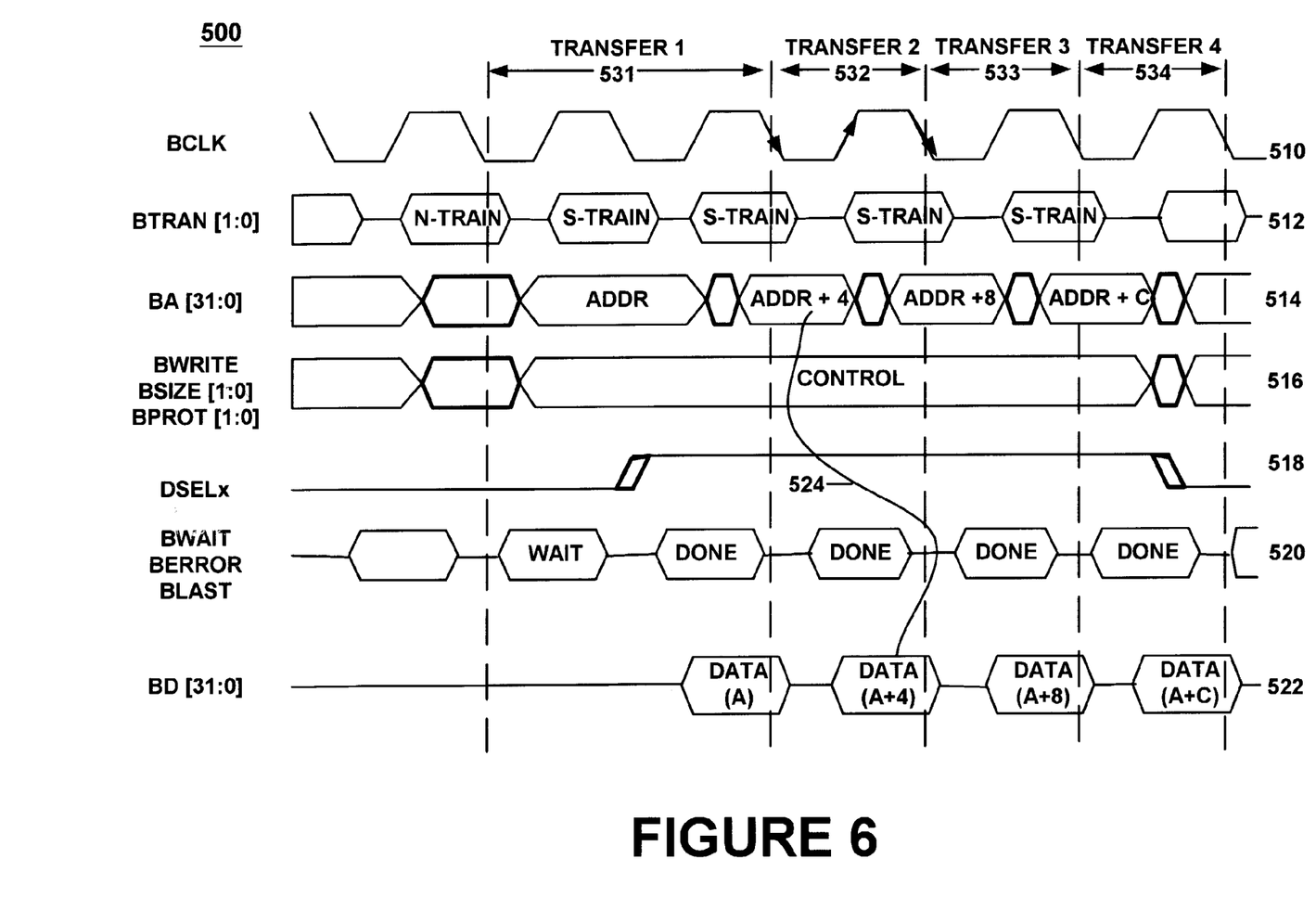
FIG. 6 is a timing diagram which illustrates use of non-sequential and sequential transfers to perform a burst transaction on the ASB bus architecture.

Refer to FIG. 3 and FIG. 6. Circuit 300a of FIG. 3 contains an input latch 310, e.g., clocked register, that is clocked on the falling edge of the ASB clock (also called the B_CLK) 360. Latch 310 receives the write, address and size data from the ASB bus 202 on the falling edge of the B_CLK 360 (see signal 510 FIG. 6). The write, address and size bus lines are represented as B_WRITE 350a, B_ADDR 352a and B_SIZE 354a and originate from the ASB bus 202. FIG. 6 illustrates a timing diagram of these signals at 514 (address) and 516. The outputs of the latch circuit 310, B_WRITE 350b, B_ADDR 352b and B_SIZE 354b are supplied to a hold circuit 312, e.g., a clocked register. The outputs of the latch circuit 310, B_WRITE 350b, B_ADDR 352b and B_SIZE 354b, are delayed when received by the hold circuit 312, which is also clocked by the falling edge of B_CLK 360.

The address and associated signals are delayed to the hold circuit 312 because the data associated with these address signals arrives one cycle after the address within the ASB bus. In one embodiment, the data bus is 32 bits wide, but could be of any bit-width within the scope of the present invention. FIG. 6 illustrates an exemplary address ("Addr+4") being presented within Transfer 2. The address is sampled on the falling edge of B_CLK as shown by the dashed line at the start of Transfer 2. However, its associated data, "Data (A+4)," does not appear on the bus until the next falling edge of the B_CLK as shown by line 524 and the subsequent dashed line. Therefore, the data lines 356a of FIG. 3 are buffered at 324 and supplied directly via bus 356b to the hold circuit 314 which is also clocked by B_CLK 360. Therefore, the hold circuit 312/314 is designed to contain all of the necessary data for a data transfer operation and manages the latency between the address and data availability on the ASB bus, as discussed above.

The B_WRITE 350c and the B_ADDR 352c outputs of the hold circuit 312 of FIG. 3 are fed to a request circuit 318 which is also clocked by the B_CLK 360 signal. The request circuit, when ready, generates a PCI request to the PCI bus 302. The LSB two bits from the address bus 352c (e.g., B_ADDR[1:0]) are fed over lines 352d to a data replicate and translate ("translate") circuit 316. Translate circuit 316 also receives the B_SIZE information over bus 354c. Data is supplied to translate circuit 316 over bus 356c from the hold circuit 314. The translate circuit 316 reformats the data of the data bus 356c into the recognized PCI format and also to allow byte, halfword and word data transfers transparently. The B_SIZE signal resides on two lines and is "00" to represent a byte transfer, is "01" to represent a halfword transfer (2 bytes) and is "10" to represent a word transfer (4 bytes).

Using the B_SIZE 354c information and the LSB bits 352d from the address bus, translate circuit 316 of FIG. 3 properly reformats the data for the PCI bus while concurrently supporting byte, halfword and word transfers. The following rules are used within translate circuit 316. Firstly, if B_SIZE indicates a fullword transfer, e.g., "10," then all 32 bits from the data bus 356c are allowed to pass through to bus 356d unchanged regardless of the address bits 352d.

Secondly, if the B_SIZE 354c indicates a halfword memory operation ("01") and the high bit of the two least significant address bits 352d is zero, e.g., "0x," then the lower half of the data bus is valid. In this example "x" stands for "don't care." In this case, bits 0 to 15 of the data bus 356c are allowed to pass through as bits 0 to 15 of data bus 356d and simultaneously, these bits are replicated on bits 16–31 of data bus 356d. Alternatively, if the B_SIZE 354c indicates a halfword memory operation and the high bit of the two address bits 352d is high, e.g., "1x," then the upper half of the data bus is valid. In this example "x" stands for "don't care." In this case, bits 16 to 31 of the data bus 356c are allowed to pass through as bits 16 to 31 of data bus 356d and simultaneously, these bits are replicated on bits 0–15 of data bus 356d.

Thirdly, if the B_SIZE 354c indicates a byte memory operation ("00") and the two address bits 352d are "00," then the first byte of the data bus is valid. In this case, bits 0 to 7 of the data bus 356c are allowed to pass through as bits 0 to 7 of data bus 356d and simultaneously, these bits are replicated, respectively, on bits 8–15, bits 16–23 and bits 24–31 of data bus 356d. Alternatively, if the B_SIZE 354c indicates a byte memory operation and the two address bits 352d are "01," then the second byte of the data bus is valid. In this case, bits 8 to 15 of the data bus 356c are allowed to pass through as bits 8 to 15 of data bus 356d and simultaneously, these bits are replicated, respectively, on bits 0–7, bits 16–23 and bits 24–31 of data bus 356d. Alternatively, if the B_SIZE 354c indicates a byte memory operation and the two address bits 352d are "10," then the third byte of the data bus is valid. In this case, bits 16 to 23 of the data bus 356c are allowed to pass through as bits 16 to 23 of data bus 356d and simultaneously, these bits are replicated, respectively, on bits 0–7, bits 8–15 and bits 24–31 of data bus 356d. Alternatively, if the B_SIZE 354c indicates a byte memory operation and the two address bits 352d are "11," then the fourth byte of the data bus is valid. In this case, bits 24 to 31 of the data bus 356c are allowed to pass through as bits 24 to 31 of data bus 356d and simultaneously, these bits are replicated, respectively, on bits 0–7, bits 8–15 and bits 16–23 of data bus 356d.

The request circuit 318 of FIG. 3 receives the reformatted data from translate circuit 316 over data line 356d. The request circuit 318 generates a read/write signal over line 370 based on the B_WRITE signal of line 350c. Also, the address line 372 is generated based on the address of 352c. The request circuit 318 is clocked by B_CLK 360. The data signals generated over data bus 376 are from data bus 356d. Circuit 320 generates a byte enable signal BEN used by the PCI bus. The BEN signal is a four bit signal which indicates the valid bytes of the data bus and is active low. When the B_SIZE information is "10" then a full word operation is in place and the BEN signal generated by circuit 320 over lines 374 is "000" to indicate all bytes valid. When the B_SIZE information is "01" and the LSB address bits are "0x," then a halfword operation Is in place and the BEN signal generated by circuit 320 over lines 374 is "1100" to indicate the lower bytes are valid. When the B_SIZE information is "01" and the LSB address bits are "1x," then a halfword operation is in place and the BEN signal generated by circuit 320 over lines 374 is "0011" to indicate the higher bytes are valid.

When the B_SIZE information is "00" and the LSB address bits are "0," then a byte operation is in place and the BEN signal generated by circuit 320 over lines 374 is "1110" to indicate the first byte is valid. When the B_SIZE information is "00" and the LSB address bits are "01," then a byte operation is in place and the BEN signal generated by circuit 320 over lines 374 is "1101" to indicate the second byte is valid. When the B_SIZE information is "00" and the LSB address bits are "10," then a byte operation is in place and the BEN signal generated by circuit 320 over lines 374 is "1011" to indicate the third byte is valid. When the B_SIZE information is "00" and the LSB address bits are "11," then a byte operation Is in place and the BEN signal generated by circuit 320 over lines 374 is "0111" to indicate the fourth byte is valid.

For a write command, interface circuit 300a of FIG. 3 operates as follows. The address and other information from the ASB bus 202 are sampled on the falling edge of the B_CLK 360 and "latched." This data is then held on the next cycle. On the rising edge, the B_WAIT, B_ERR and B_LAST should be ready but the data is not ready until the next clock cycle. The data is then latched into the hold circuit 314 on the next falling edge of the B_CLK 360 along with the latched address and other information latched by hold circuit 312. Data translations are then accomplished by translate circuit 316, as described above. When the address and data are available, the request circuit 318 issues a request signal (to PCI bus) to indicate the transaction is ready and waits for an acknowledgment from the PCI bus. An expanded operation is described with respect to FIG. 7 (write operation) and FIG. 8 (read operation) below.

With regard to the readback path of circuit 300a of FIG. 3, the PCI bus 302 provides a read address, RD_ADDR 380, a read BEN (RD_BEN 382) and read data (RD_DATA 384a) to a second data replicate and translate ("translate") circuit 328. Translate circuit 328 generates the proper data bus format for the ASB bus 202 and operates as follows. If the read BEN signal 382 indicates "000," then all four bytes are active and bits 0 to 31 of read data bus 384a are passed through as bits 0 to 31 of data bus 384b. If the re ad BEN signal 382 indicates "1100," then bits 0 to 15 of read data bus 384a are passed through to bits 0 to 15 of data bus 384b and also replicated onto bits 16 to 31 of data bus 384b. If the read BEN signal 382 indicates "0011," then bits 16 to 31 of read data bus 384a are passed through to bits 16 to 31 of data bus 384b and also replicated onto bits 0 to 15 of data bus 384b.

If the read BEN signal 382 indicates "11109," then bits 0 to 7 of data bus 384a are passed through to bits 0 to 7 of data bus 384b and also replicated, respectively, onto bits 8–15, 16–23 and 24–31 of data bus 384b. If the read BEN signal 382 indicates "1101," then bits 8 to 15 of data bus 384a are passed through to bits 8 to 15 of data bus 384b and also replicated, respectively, onto bits 0–7, 16–23 and 24–31 of data bus 384b. If the read BEN signal 382 indicates "1011," then bits 16 to 23 of data bus 384a are passed through to bits 16 to 23 of data bus 384b and also replicated, respectively, onto bits 0–7, 8–15 an d 24–31 of data bus 384b. If the read BEN signal 382 indicates "0111," then bits 24 to 31 of data bus 384a are passed through to bits 24 to 31 of data bus 384b and also replicated, respectively, onto bits 0–7, 8–15 and 16–23 of data bus 384b.

The formatted data of bus 384b is latched into circuit 322 on the falling edge of the B_CLK 360 and this data is provided on bus 384c to a tristate buffer 326 which allows the data to pass through when enabled by signal 407 generated by data enable circuit 321. The remainder of the ASB handshake signals, B_WAIT, B_ERR and B_LAST are generated by PCI handshake generator circuit 330 over lines 392, 394 and 396, respectively. Enable circuit 332 generates an enable signal over line 405 to tristate buffers 334, 336 and 338 which enable the output of the above signals to ASB bus 202. It is appreciated that a number of well known circuits and methods can be used to implement circuit 330 which is clocked by B_CLK 360.

Generally, during an ASB read request, the read data is latched on the rising edge of the ASB clock 360 such that an ASB master agent (not shown) can latch its requested data on the next falling edge of the ASB clock. The other handshake signals (B_WAIT, B_LAST and B_ERR) are latched on the falling edge of the ASB clock 360 and the output en able is asserted during the low duration of the edge of the ASB clock. The ASB master agent can sense the handshake on the rising edge of the ASB clock. In this embodiment 300a, a new ASB request can be processed while previous data is being served, in a pipelined fashion.

Figure 7:
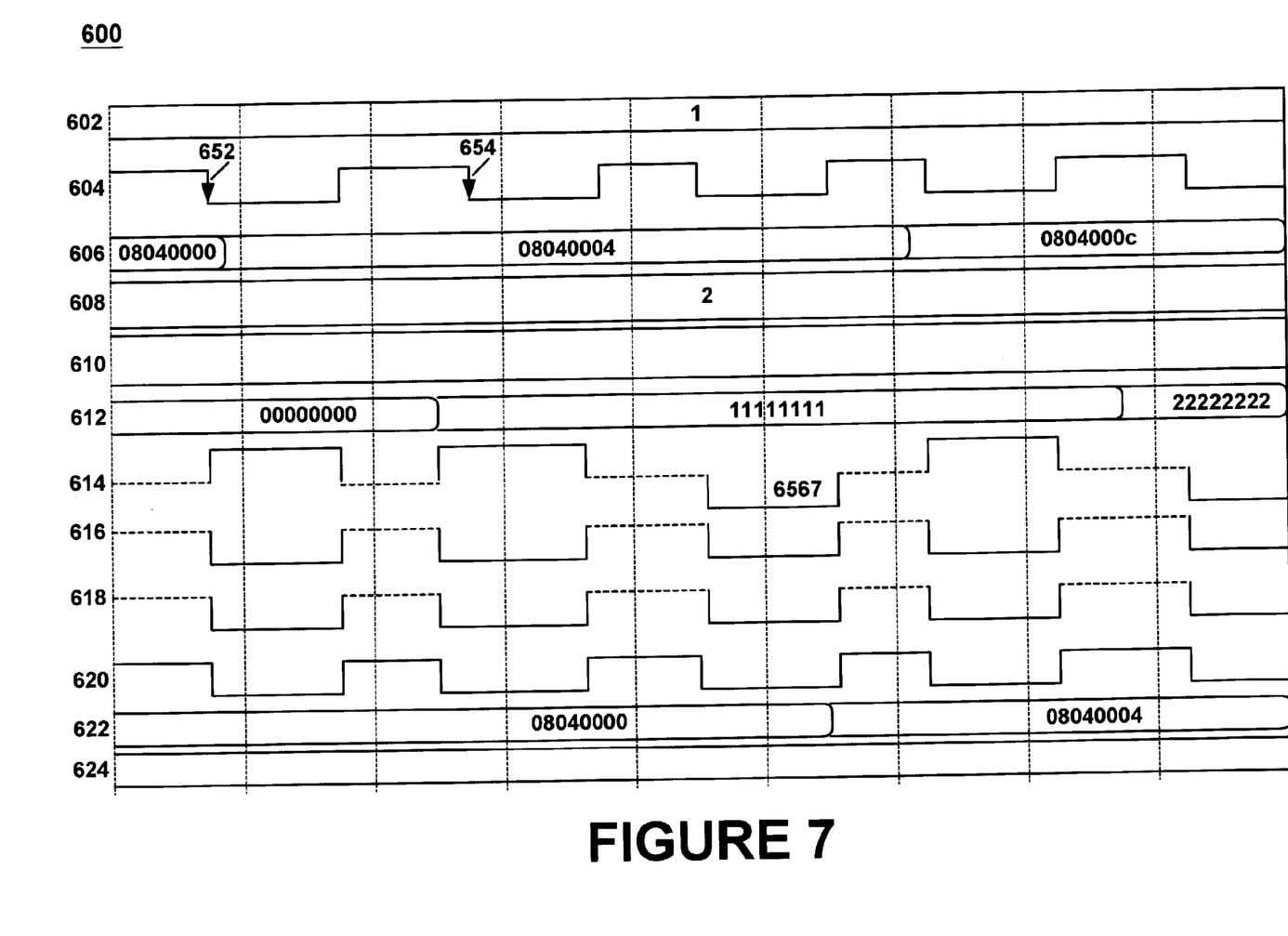
FIG. 7 is a timing diagram which illustrates the pertinent signals generated by the ASB slave interface circuit of the present invention during an ASB write cycle.

FIG. 7 Illustrates a timing diagram 600 of the pertinent signals involved in performing a write operation using the ASB slave interface circuit 300a of the present invention. In this particular example the write operation produces an address and data and this data is to be stored in the memory unit (SRAM) 210 of FIG. 2 at the indicated address. Signal 604 and signal 620 of FIG. 7 represent the ASB clock (B_CLK) signal. Signal 606 is the address signal (B_ADDR) and signal 610 is the B_WRITE signal and is high indicating a write operation. The B_WAIT, B_ERR and B_LAST signals are shown as signals 614, 616 and 618, respectively. The address "0804004" is sampled on the low clock transition 652. The corresponding data for this address, signal 612, does not appear on the ASB bus 202 until one clock cycle later and the data is "11111111." This value appears on the B_DATA signal 612. The data could be sampled at 654, but the wait signal 614 is asserted at that time. The data is therefore transferred at 656 when the wait signal 614 is low and the transfer is allowed. The B_SIZE data is shown at signal 608 and is "10" binary or '2' decimal indicating a fullword data transfer operation. Because the transfer is a fullword, no data formatting is required by circuit 316 (FIG. 3).

Signal 622 of FIG. 7 represents the slave request address output (bus 372 of FIG. 3) and signal 624 represents the slave write signal output (line 370 of FIG. 3). The slave data signal output (bus 376) is represented as signal 626. The slave output BEN signal (bus 374) is represented as signal 628 and is "0000" indicating a fullword operation. As shown, the request circuit 318/320 of FIG. 3 asserts the new address and new data signals concurrently for the request (aligned at 658). The slave request signal is shown as signal 630 and when asserted indicates that the address and data are present and ready to be used. The request pulse is generated at 658 and indicates a request to perform the operation because the data and address values are present concurrently at that time. The acknowledge pulse returns at 660 of signal 634 and indicates that the write operation data has been processed. Signal 636 is the latch enable for circuit 322.

It is appreciated that the ASB slave interface circuit 300a is pipelined, having latch, hold and request stages. The pipelined configuration allows the address and data signals to be automatically synchronized for a particular operation. The pipelined configuration also allows the interface circuit to process data in its natural flow, without requiring the insertion of wait states. Burst transactions are particularly well suited to be processed by the ASB slave interface circuit 300a. Also, the read and write pipelines can be allowed to operate at optimum frequency and they do not need to be synchronized to each other.

Figure 8:
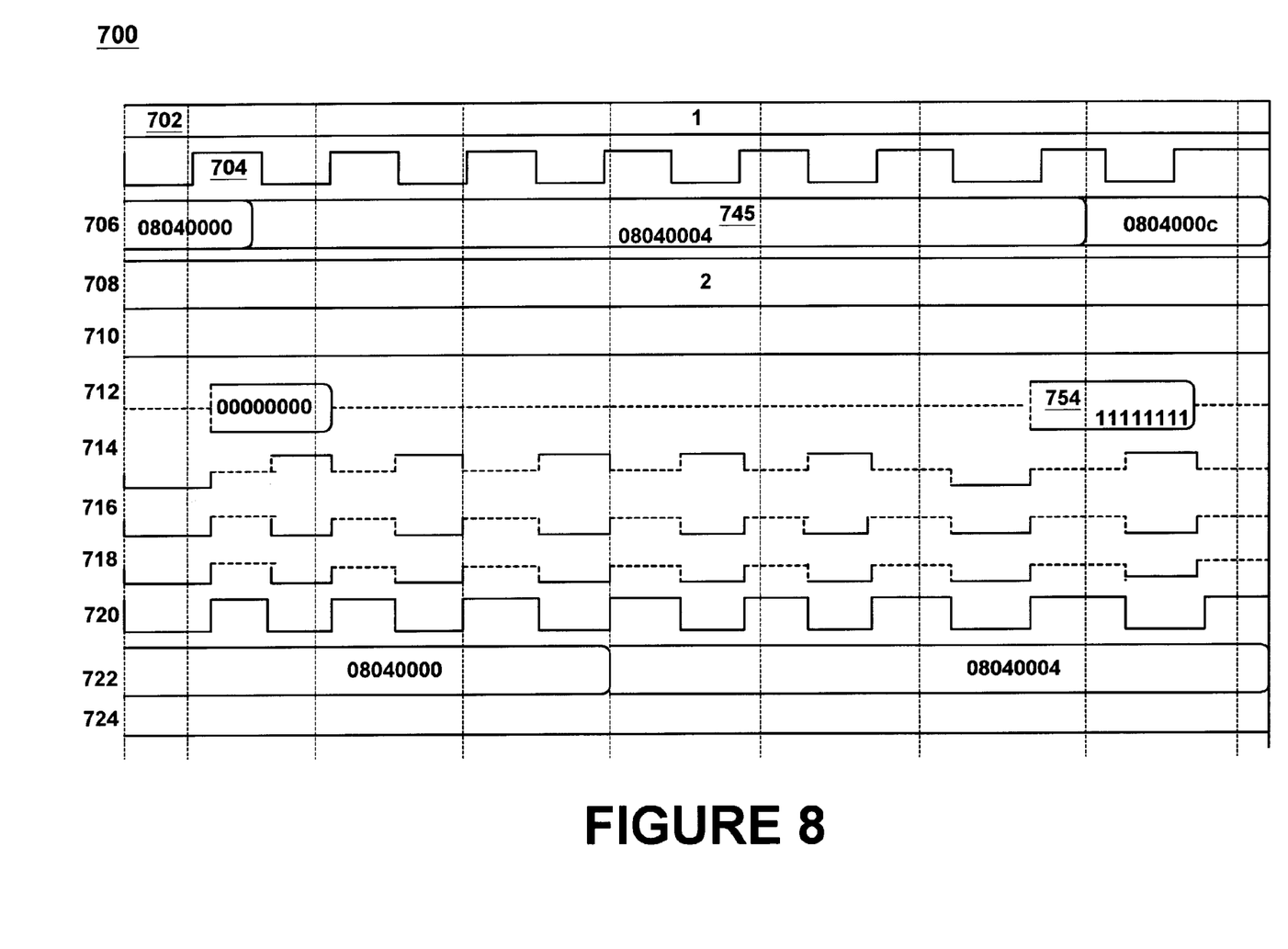
FIG. 8 is a timing diagram which illustrates the pertinent signals generated by the ASB slave interface circuit of the present invention during an ASB read cycle.

FIG. 8 illustrates a timing diagram 700 of the pertinent signals involved in performing a read operation using the ASB slave interface circuit 300a of the present invention. In this operation, the ASB bus 202 requests a read of data stored on the PCI side at a given address. The PCI side therefore produces the required data at the indicated address. Signal 704 and signal 720 represent the B_CLK signal and signal 706 is the address signal, B_ADDR. Signal 708 is the B_SIZE signal and signal 710 is the B_WRITE signal. The write signal is low indicating a read operation. Signal 712 is the B_DATA signal. The B_WAIT, B_ERR and B_LAST signals are represented on signals 714, 716 and 718, respectively. When the wait signal goes low, the data is available on the next cycle (on the next rising edge of the B_CLK).

Signal 722 of FIG. 8 represents the slave address (bus 372) and signal 724 is the write signal (line 370). The slave BEN signal is shown as signal 728 and the slave request signal is shown as signal 730. The slave acknowledge signal is 734 and the strobe or data valid signal is 736. The slave data signal is shown as signal 738. For the read operation, the read address is presented over signal 704 as "804004" of the B_ADDR bus. This address is latched and held and stored in the request circuit 318 of FIG. 3 and asserted in signal 722 at pulse 750 which commences a read request. The related acknowledge is obtained at pulse 756 of signal 734. The strobe signal 736 indicates that the data is valid at pulse 758. Pulse 758 corresponds to the data "11111111" of signal 738 which is provided in response to the request pulse 750. This data is presented over data bus 384a (FIG. 3) and is the RD_DATA.

This data is reformatted by circuit 328 of FIG. 3 and eventually is latched from circuit 322 onto bus 384c and buffered onto the B_DATA bus of the ASB bus 202 as shown in point 754 of signal 712 (FIG. 8). In this case, the BEN signal at 728 is "0000" which indicates that a fullword read operation is in place. No data formatting is therefore required. The operation is complete when the data reaches the ASB bus 202.

Figure 4:
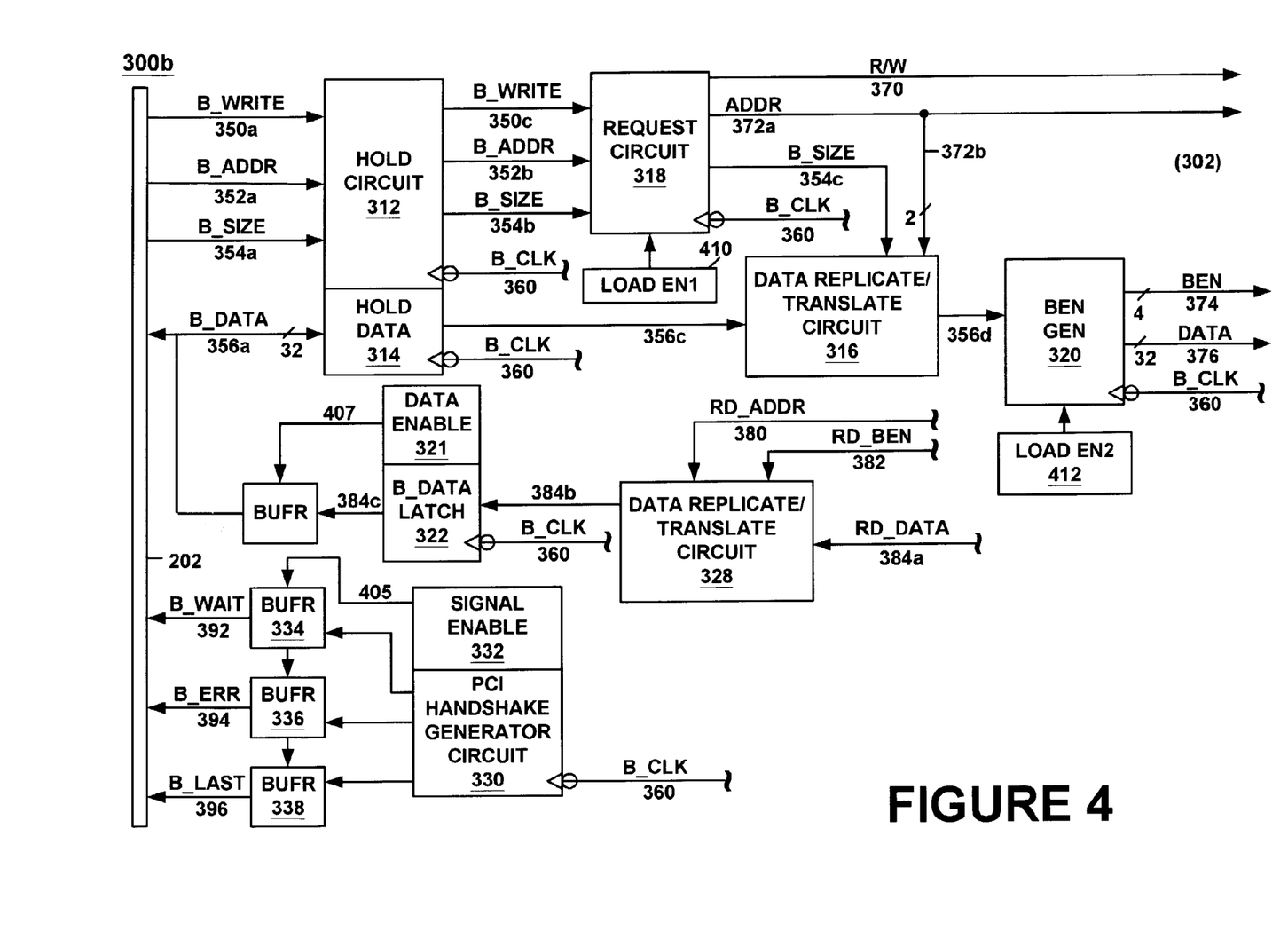
FIG. 4 is a circuit diagram of a second embodiment of the ASB slave interface circuit of the present invention without the input latch circuitry of FIG. 3.

FIG. 4 illustrates an embodiment 300b of the ASB slave circuit of the present invention that does not utilize input latch registers. This embodiment 300b is particularly well suited for ASIC implementation where register count is kept to a minimum. The B_ADDR, B_SIZE and B_WRITE buses 352a, 354a and 350a, respectively, of the ASB bus 202 are directly fed to the hold circuit 312. The B_DATA bus 356a is also directly fed to hold circuit 314. The outputs of the hold circuit 312 are fed to a request circuit 318. A load enable signal 410 is then fed to the request circuit 318. Another load enable signal 412 is used to control the BEN generate circuit 320 (which is part of the "request circuit"). The output of the hold data circuit 314 is fed directly to the data replicate and translate circuit 316. The return path, e.g., from buses 380, 382 and 384a to bus 202, is analogous to the return path of FIG. 3. Circuits 320 and 316 operate in the same fashion as described above with respect to FIG. 3.

The load enable signal 410 of FIG. 4 loads in the address and other information then goes low to prevent this information from being lost. Synchronization of the load enable signal can be done such that it occurs just before the arrival of the data signals so that the request circuit 318 and its BEN generator circuit 320 will simultaneously hold the address, data, size and R/W information for use by the PCI bus. A finite state machine (FSM) can control the assertion of the load enable signals. The data arrives at the next cycle over bus 356c and is translated and reformatted by circuit 316, as described above. In operation, when the address and data are present concurrently, the request signal is generated by circuit 318. Then, the ASB interface circuit 300b waits for the corresponding acknowledge signal and then deactivates the load enable. By using this configuration and the load enable signal, the input latch circuits can be removed and the same pipeline advantages of circuit 300a can still be realized. Specifically, embodiment 300b is well suited for processing ASB burst cycles. In this embodiment, a new ASB request can be processed while previous data is being served, in a pipelined fashion.

Figure 5:
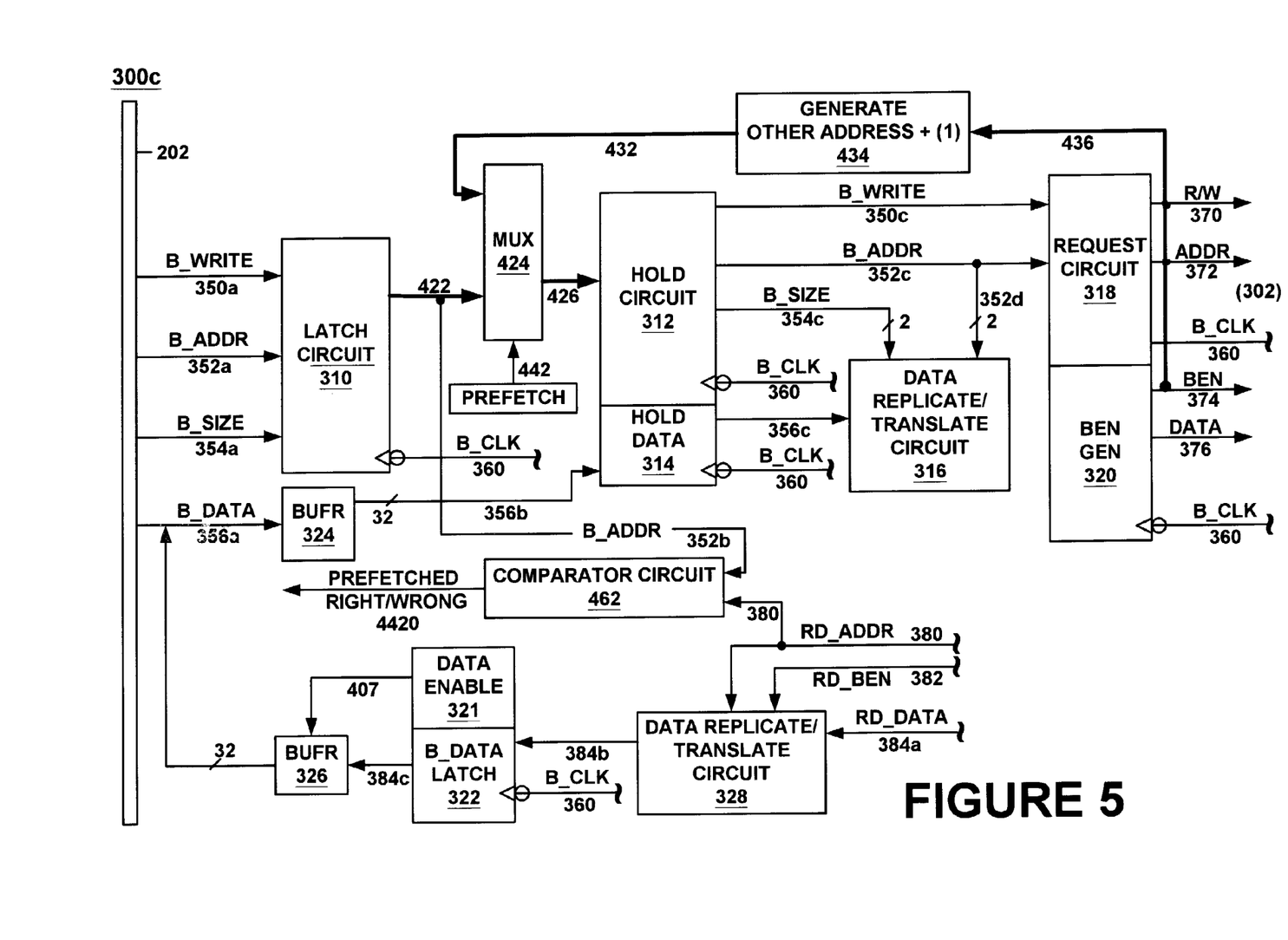
FIG. 5 is a circuit diagram of a third embodiment of the ASB slave interface circuit of the present invention having a prefetch circuit for high speed performance.

FIG. 5 illustrates another embodiment 300c of the ASB slave circuit of the present invention that utilizes the input latch registers 310 but also contains prefetching circuitry for improved performance. Therefore, circuit 300c is a high performance embodiment of the ASB slave interface of the present invention. A prefetch address generator circuit 434 generates the next expected address for burst transactions depending on byte, word or halfword operations. If the operation is byte, then each address is incremented by one (I=1). If the operation is halfword, then each address is incremented by two (I=2). If the operation is fullword, then each address is incremented by four (I=4). Circuit 434 therefore generates the next expected address, B_ADDR, and also generates the B_WRITE and B_SIZE information necessary to perform the predicted operation. This information is output over bus 432 to a first input of multiplexer 424.

Latch circuit 310 receives the B_WRITE line 350a, the B_ADDR bus 352a and the B_SIZE bus 354a from the ASB bus 202. Signals over these lines are then forwarded by the latch circuit 310 over bus 422 to the second inputs of the multiplexer 424. The output bus 426 of the multiplexer 424 is input to the hold circuit 312. Bus 426 contains the B_WRITE, B_ADDR and B_SIZE information. A prefetch signal 442 controls the selection of the multiplexer 424 to either take from the ASB bus 202 or take from the prefetch generator circuit 434. The circuitry between the hold circuit 312 and the request circuit 318 is analogous to that described with respect to FIG. 3.

The output from the request circuit 318 of FIG. 5 is fed to the PCI bus 302 and also feed back to the prefetch generator circuit 434. Specifically, the R/W line 370, the ADDR bus 372 and the BEN bus 374 are fed over bus 436 to the input of the prefetch generator circuit 434. The B_ADDR 352b from bus 422 is supplied to a comparator 462 which compares this address against the read address RD_ADDR 380. A prefetched right/wrong signal over line 4420 is generated by the comparator 462 to indicate if the prefetch computation was guessed right or wrong. If the addresses match, then the prefetch results are used. Although not shown for clarity, circuit 300c also contains the same readback circuitry as circuit 300a and 300b.

In operation, when a first ASB command is processed, interface circuit 300c then prefetches for the next expected command. If the next expected command matches addresses with the prefetched version, then the data will be available immediately for the second ASB command and this data will be located on the read data bus RD_DATA 384a. An address match occurs when the return address (RD_ADDR) matches with the requested address over bus 422. A prefetch signal 442 allows circuit 300c to obtain and process address information from the ASB bus 202 and also to allow a prefetch address to be used for high speed performance. If the prefetch circuit guessed wrong, then the address from the ASB bus is used to obtain the proper data. Therefore, circuit 300c allows for data prefetching of the next expected address location. Specifically, this circuit 300c allows for prefetching of the next number of locations if burst FIFO (first-in-first-out) is used on read data.

The preferred embodiment of the present invention, a slave interface circuit for providing communication between a PCI bus domain and an ASB bus domain of an electronic system, is described. While the present invention has been described in particular embodiments, it should be appreciated that the present invention should not be construed as limited by such embodiments, but rather construed according to the below claims.

What is claimed is:

1. A pipelined interface circuit comprising:

an input latch circuit for receiving and holding address and size signals from a first bus domain;

a hold circuit for receiving and holding outputs from said input latch circuit and for receiving and holding data signals from said first bus domain wherein said data signals arrive one clock cycle after said address and size signals;

a first data translate and replicate circuit coupled to said hold circuit and for reformatting said data signals into first formatted data signals which are formatted for a second bus domain; and a request circuit for receiving outputs from said first data translate and replicate circuit and for receiving outputs from said hold circuit, said request circuit for generating a request to said second bus domain and for simultaneously providing said second bus domain with said address signals, said first reformatted data signals and byte enable signals and wherein said input latch circuit, said hold circuit and said request circuit are all clocked by a clock signal of said first bus domain.

2. A pipelined interface circuit as described in claim 1 wherein said first bus domain is compliant with the Advanced Microcontroller Bus Architecture (AMBA) Advanced System Bus (ABS) bus standard and wherein said second bus domain is compliant with the Peripheral Component Interconnect (PCI) bus standard.

3. A pipelined interface circuit as described in claim 1 wherein said first data translate and replicate circuit receives said size signals and least significant bits (LSB) of said address signals and wherein said first data translate and replicate circuit is for passing through all data bytes of said data signals provided said size signals indicate a fullword operation.

4. A pipelined interface circuit as described in claim 3 wherein said first data translate and replicate circuit is also for passing through least significant bytes of said data signals and replicating said least significant bytes onto most significant byte locations of said first formatted data signals provided said size signals indicate a halfword operation and said LSB of said address signals indicate "0x."

5. A pipelined interface circuit as described in claim 3 wherein said first data translate and replicate circuit is also for passing through most significant bytes of said data signals and replicating said most significant bytes onto least significant byte locations of said first formatted data signals provided said size signals indicate a halfword operation and said LSB of said address signals indicate "1x."

6. A pipelined interface circuit as described in claim 3 wherein said first data translate and replicate circuit is also for passing through a given byte of said data signals and for replicating said given byte on all other byte positions of said first formatted data signals provided said size signals indicate a byte operation and wherein said LSB of said address signals indicate said given byte.

7. A pipelined interface circuit as described in claim 1 further comprising:

a second data translate and replicate circuit coupled to receive address, data and byte enable signals from said second bus domain and for providing second formatted data signals; and a data latch circuit for receiving said second formatted data signals and for providing said second formatted data signals to said first bus domain wherein said data latch circuit is clocked by said clock of said first bus domain.

8. A pipelined interface circuit as described in claim 1 wherein said request circuit further comprises a byte enable generation circuit for generating said byte enable signals based on said size and said address signals.

9. A pipelined interface circuit comprising:

a hold circuit for receiving and holding address and size signals from a first bus domain and also for receiving and holding data signals from said first bus domain wherein said data signals arrive one clock cycle after said address and size signals;

a first data translate and replicate circuit coupled to said hold circuit and for reformatting said data signals into first formatted data signals which are formatted for a second bus domain; and a request circuit for receiving outputs from said first data translate and replicate circuit and from said hold circuit, said request circuit enabled by a load enable signal which is synchronized with the arrival of said data signals and for generating a request to said second bus domain, said request circuit for simultaneously providing said second bus domain with said address signals, said first reformatted data signals and byte enable signals and wherein said hold circuit and said request circuit are both clocked by a clock signal of said first bus domain.

10. A pipelined interface circuit as described in claim 9 wherein said first bus domain is compliant with the Advanced Microcontroller Bus Architecture (AMBA) Advanced System Bus (ASB) bus standard and wherein said second bus domain is compliant with the Peripheral Component Interconnect (PCI) bus standard.

11. A pipelined interface circuit as described in claim 9 wherein said first data translate and replicate circuit receives said size signals and least significant bits (LSB) of said address signals and wherein said first data translate and replicate circuit is for passing through all data bytes of said data signals provided said size signals indicate a fullword operation.

12. A pipelined interface circuit as described in claim 11 wherein said first data translate and replicate circuit is also for passing through least significant bytes of said data signals and replicating said least significant bytes onto most significant byte locations of said first formatted data signals provided said size signals indicate a halfword operation and said LSB of said address signals indicate "0x."

13. A pipelined interface circuit as described in claim 11 wherein said first data translate and replicate circuit is also for passing through most significant bytes of said data signals and replicating said most significant bytes onto least significant byte locations of said first formatted data signals provided said size signals indicate a halfword operation and said LSB of said address signals indicate "1x."

14. A pipelined interface circuit as described in claim 11 wherein said first data translate and replicate circuit is also for passing through a given byte of said data signals and for replicating said given byte on all other byte positions of said first formatted data signals provided said size signals indicate a byte operation and wherein said LSB of said address signals indicate said given byte.

15. A pipelined interface circuit as described in claim 8 further comprising:

a second data translate and replicate circuit coupled to receive address, data and byte enable signals from said second bus domain and for providing second formatted data signals; and a data latch circuit for receiving said second formatted data signals and for providing said second formatted data signals to said first bus domain wherein said data latch circuit is clocked by said clock of said first bus domain.

16. A pipelined interface circuit as described in claim 8 wherein said request circuit further comprises a byte enable generation circuit for generating said byte enable signals based on said size and said address signals.

17. A pipelined interface circuit comprising:

an input latch circuit for receiving and holding address and size signals from a first bus domain;

a prefetch circuit for automatically generating a next address signal;

a multiplexer circuit for receiving outputs from said input latch circuit and from said prefetch circuit and for selecting therebetween;

a hold circuit for receiving and holding outputs from said multiplexer circuit and for receiving and holding data signals from said first bus domain wherein said data signals arrive one clock cycle after said address and size signals;

a first data translate and replicate circuit coupled to said hold circuit and for reformatting said data signals into first formatted data signals which are formatted for a second bus domain; and a request circuit for receiving outputs from said first data translate and replicate circuit and for receiving outputs from said hold circuit, said request circuit for generating a request to said second bus domain and for simultaneously providing said second bus domain with said address signals, said first reformatted data signals and byte enable signals, said request circuit also providing said address signals to said prefetch circuit.

18. A pipelined interface circuit as described in claim 17 wherein said input latch circuit, said hold circuit and said request circuit are all clocked by a clock signal of said first bus domain and wherein further said first bus domain is compliant with the Advanced Microcontroller Bus Architecture (AMBA) Advanced System Bus (ASB) bus standard and wherein said second bus domain is compliant with the Peripheral Component Interconnect (PCI) bus standard.

19. A pipelined interface circuit as described in claim 18 wherein said first data translate and replicate circuit receives said size signals and least significant bits (LSB) of said address signals and wherein said first data translate and replicate circuit is for passing through all data bytes of said data signals provided said size signals indicate a fullword operation.

20. A pipelined interface circuit as described in claim 19 wherein said first data translate and replicate circuit is also for passing through least significant bytes of said data signals and replicating said least significant bytes onto most significant byte locations of said first formatted data signals provided said size signals indicate a halfword operation and said LSB of said address signals indicate "0x" and wherein said first data translate and replicate circuit is also for passing through most significant bytes of said data signals and replicating said most significant bytes onto least significant byte locations of said first formatted data signals provided said size signals indicate a halfword operation and said LSB of said address signals indicate "1x."

21. A pipelined interface circuit as described in claim 19 wherein said first data translate and replicate circuit is also for passing through a given byte of said data signals and for replicating said given byte on all other byte positions of said first formatted data signals provided said size signals indicate a byte operation and wherein said LSB of said address signals indicate said given byte.

22. A pipelined interface circuit as described in claim 19 further comprising:

a second data translate and replicate circuit coupled to receive address, data and byte enable signals from said second bus domain and for providing second formatted data signals; and a data latch circuit for receiving said second formatted data signals and for providing said second formatted data signals to said first bus domain wherein said data latch circuit is clocked by said clock of said first bus domain.

23. A pipelined interface circuit as described in claim 19 wherein said request circuit further comprises a byte enable generation circuit for generating said byte enable signals based on said size and said address signals.

* * * * *